M. MITCHELL.
PROCESS OF PRESERVING ROLLER BLOCKS.
APPLICATION FILED APR. 22, 1919.
1,315,607.
Patented Sept. 9, 1919.
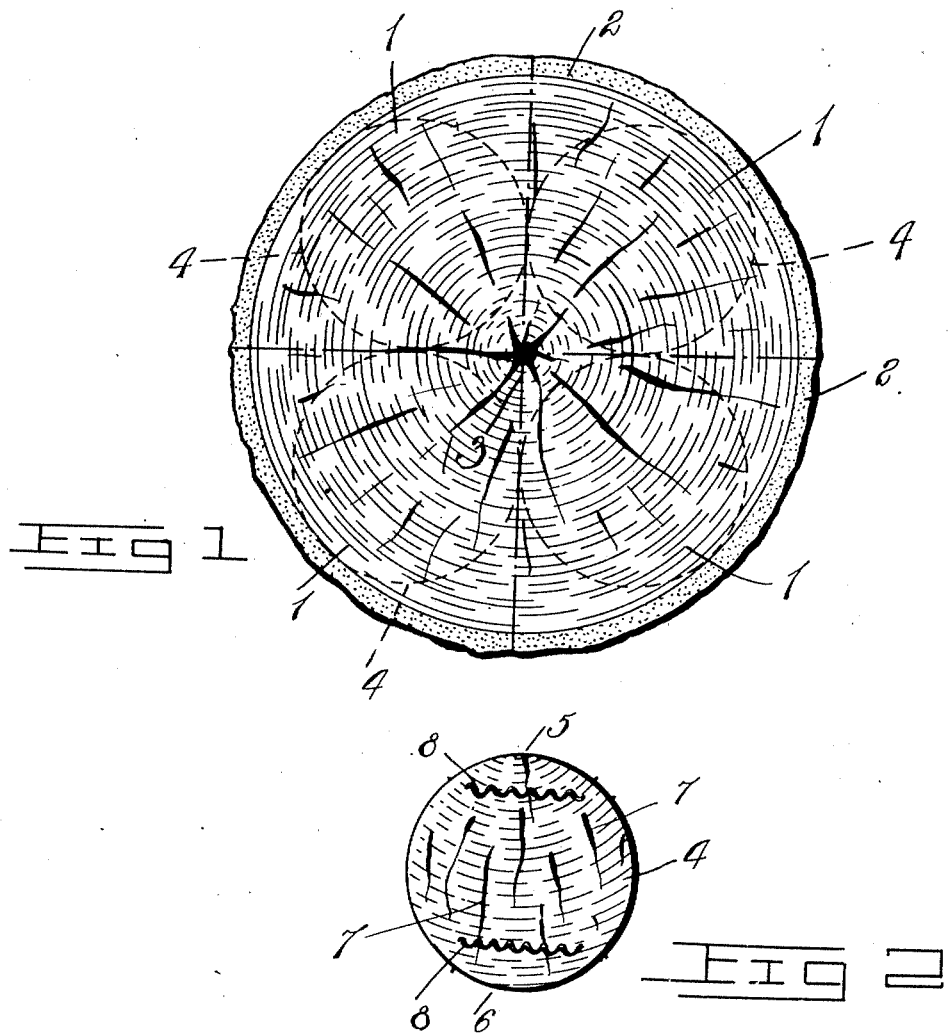

UNITED STATES PATENT OFFICE.

MOOREHOUSE MITCHELL, OF QUEBEC, QUEBEC, CANADA.

PROCESS OF PRESERVING ROLLER-BLOCKS.

1,315,607.   Specification of Letters Patent.   Patented Sept. 9, 1919.

Application filed April 22, 1919. Serial No. 291,922.

*To all whom it may concern:*

Be it known that I, MOOREHOUSE MITCHELL, a subject of the King of Great Britain, residing at Quebec, Province of Quebec, Canada, have invented certain new and useful Improvements in Processes of Preserving Roller-Blocks; and I do hereby declare that the following is a full, clear, and exact description of the invention, such as will enable others skilled in the art to which it appertains to make and use the same.

The present invention relates to wood preservation and more particularly to a method of forming and preserving roller blocks which may be made from maple or other hard wood and which are used more particularly in connection with mangles so as to prevent the same from cracking.

An object of the present invention is to establish a method of forming such roller blocks whereby the wood will be permitted to properly dry without any part of the block fermenting which would cause decay, thereby greatly increasing the strength of the block and insuring its life.

With the above and other objects in view the process will be better understood from a consideration of the following detailed description taken in connection with the accompanying drawings, in which:

Figure 1 is a section through a tree illustrating the manner in which the tree may be split into four sections and the roller block being cut from each section; and, Fig. 2 is a detail section through one of the roller blocks having been formed and treated in accordance with the present invention.

Referring now more particularly to the accompanying drawings wherein like and corresponding parts are designated by similar reference characters throughout the several views—

In carrying out the present invention it is desirable to form the roller blocks from trees having a large diameter. In Fig. 1 of the drawings I have illustrated a section through an ordinary tree and this tree is to be split into four sections indicated by the numeral 1 and each section having a bark surface 2 and a heart portion 3. A roller block 4 is cut from each section and a portion 5 of the periphery of each roller block is the bark surface whereas the portion 6 of the periphery of each roller block is the heart surface or end of the block. Each log of a tree is formed with rays indicated by the numeral 7 which extend diagonally and when these roller blocks are formed the rays of the log extend vertically through the blocks from the heart end to the bark surface of the blocks. After these roller blocks have been cut and formed the ends may be reinforced by driving therein the metallic reinforcing corrugated plates 8.

The periphery of the roller blocks after being so formed are varnished upon their heart surface and the bark surface indicated by the numerals 6 and 5 respectively, so as to check evaporation but the opposite portions of the periphery of the blocks are not varnished so that evaporation may be continued without any part of the block fermenting, which would cause decay. If the entire periphery of each block is varnished the evaporation would be prevented, but by only having the heart and the bark surface of each roller block varnished evaporation at this point would be prevented, thereby preventing the roller block from cracking at the heart or bark surface which is subject to cracking during the period of drying.

These blocks are of course cut from green wood, and whereas I have shown the same is to be cylindrical they may be of any desired configuration.

Having thus fully described my invention, what I claim as new and desire to secure by Letters Patent is:

1. The method of preserving a roller block cut from green wood and having the rays of the wood extending from the heart surface to the bark surface of the roller, applying varnish over the heart surface and the bark surface and the intermediate portions of said roller being left unvarnished.

2. The method of preserving a roller block having a heart surface and a bark surface, varnish being applied to said heart and bark surfaces, and a metallic corrugated reinforcing member inserted within the opposite ends of said block adjacent said heart and said bark surfaces, substantially as and in the manner specified.

In witness whereof I have hereunto set my hand.

MOOREHOUSE MITCHELL.